UNITED STATES PATENT OFFICE.

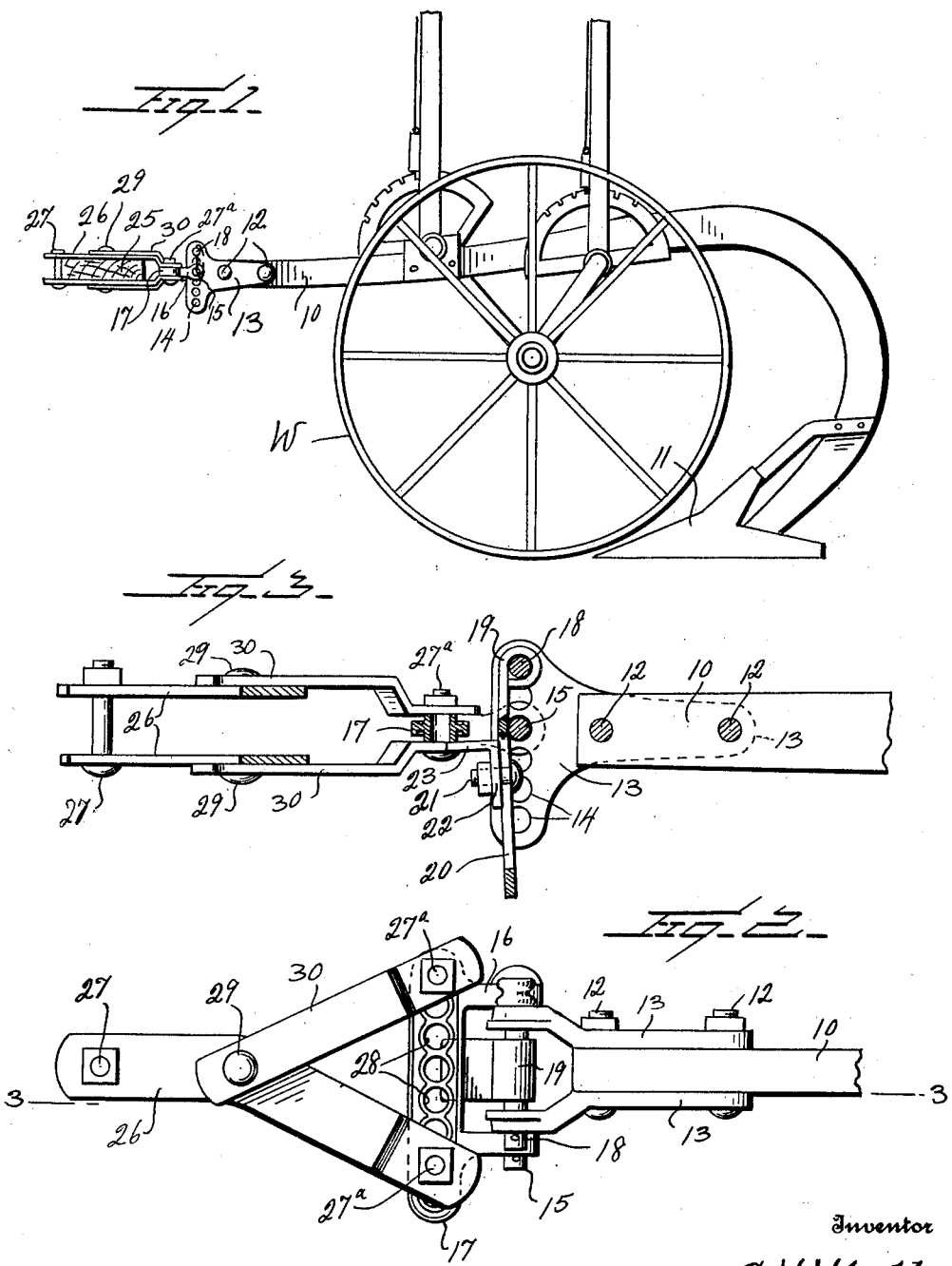

GEORGE W. WHATLEY, OF CLOVIS, NEW MEXICO.

CLEVIS.

1,373,692. Specification of Letters Patent. Patented Apr. 5, 1921.

Application filed November 3, 1920. Serial No. 421,570.

*To all whom it may concern:*

Be it known that I, GEORGE W. WHATLEY, a citizen of the United States, residing at Clovis, in the county of Curry and State of New Mexico, have invented certain new and useful Improvements in Clevises, of which the following is a specification, reference being had to the accompanying drawings.

This invention relates to certain improvements in clevises, and more particularly, to a clevis adapted for use in connection with wheeled plows.

An important object of the invention is to provide a clevis which admits connection of a draft bar with the plow organization in such a manner that the plow when leaving the furrow is elevated from engagement with the ground automatically, thereby eliminating the necessity of manipulation of the usual levers provided for this purpose.

A further object of the invention is to provide a clevis which will hold the plow straight and in fixed transverse relation to the draft bar.

A still further object of the invention is to provide a clevis embodying a bar attached portion and a beam portion pivotally connected to swing in a vertical plane together with means for preventing downward movement of the beam attached portion beyond the axial line of the beam.

Other objects and advantages of the invention will become apparent throughout the course of the following description:

In the accompanying drawings, wherein for the purpose of illustration is shown a preferred embodiment of my invention, and wherein like reference characters designate like parts throughout:

Figure 1 is a side elevation of a wheel plow organization provided with a clevis constructed in accordance with my invention;

Fig. 2 is a plan view of my clevis, and

Fig. 3 is a vertical sectional view taken through the same.

Referring now more particularly to the drawings, the numeral 10 indicates a wheel supported plow beam, the rear end of which extends downwardly and has mounted thereon a plow 11. The forward end of the beam has secured thereto, as by means of bolts 12, side plates 13 which are provided in their forward ends with approximately vertical rows of alined openings 14.

These openings are, with the exception of the uppermost opening of each row, adapted for the selective reception of a bolt or transverse pivot pin 15, the ends of which extend beyond the outer faces of the plates and through openings formed in the rearwardly extending bars 16 of a transverse, approximately horizontal bar 17, whereby the bar 17 is pivotally connected to the side plates 13.

The uppermost openings combine for the reception of a pivot pin 18 upon which, intermediate the side plates 13, is pivotally mounted the upper end of a downwardly extending plate 19 which is provided approximately centrally thereof with a vertical slot 20 which slidably receives a bolt 21, the bolt 21 having its head disposed rearwardly of the plate. The forward end of the bolt 21 extends through an opening formed in a plate 22 which slidably abuts the forward face of the plate 19 at the sides of the slot. The upper end of the plate 22 is provided with an approximately horizontal, forwardly extending portion 23 which extends beneath the pivotal plate 17 to support the same and limit downward movement thereof, the plate 22 being held in adjusted position by means of a binding nut upon the bolt 21. The rear face of the plate 19 abuts the pivot pin 15 which forms a limit for its rearward movement.

To the draft bar 25 a pair of angle plates 26 are connected as by means of a bolt 27 and extend rearwardly of the draft bar, the rear ends of these plates being adapted to engage opposite sides of the pivotal plate 17 and being provided with alined openings adapted for the reception of a retaining member 27ª extending through the alined openings and through one of the openings 28 of the pivotal plate 27. These openings of the plate 27 are spaced longitudinally thereof, to permit adjustable engagement of the securing means. To each of the plates 26, approximately centrally thereof, is rigidly secured, as at 29, a rearwardly extending plate 30 which diverges from the plate 26 to which it is attached. These plates are likewise provided with alined openings adapted to coact with the openings 28 of the pivotal plate 17 for the reception of a securing means.

From an inspection of the drawings it will be obvious that the beam 10 is pivotally mounted upon the wheel W at approximately its center, and accordingly, could be capable of pivotal movement in either direction thereabout. It will be obvious, however, that the peculiar construction of my clevis, while permitting tilting of the beam so as to move the plow upwardly from the ground, prevents downward movement of the plow toward the ground beyond a given limit as the forwardly extending portion 23 of the plate 22 coming into contact with the plate 17 will limit this movement. It will, therefore, be seen that the sections of the clevis may break vertically in the direction in which the plow is moving upwardly from the ground but that movement of the plow toward the ground is limited when the bar attached portion of the clevis is axially alined with or so positioned that it parallels the axis of the beam.

Due to the fact that the plate 17 is rigidly secured against angular displacement with relation to the beam, the plow will follow correctly. It will be obvious that when the wheels supporting the plow beam are elevated from the furrows, the plow will be elevated sufficiently to clear the ground during the period intermediate the times when the wheels are elevated from the furrow and are again returned to the same.

It will be obvious that my invention, by reason of its simplicity, durability and the ease with which it may be manufactured is particularly well adapted for the purpose for which it is intended; and it will likewise be obvious that the construction hereinbefore set forth is capable of some change without departing from the spirit and scope of my invention. I do not, therefore, limit myself to the specific embodiment hereinbefore set forth, except as so limited by the sub-joined claims.

What I claim is:

1. In combination with a wheel supported plow beam, a draft bar, a clevis connecting said beam and bar comprising side plates secured to said beam and provided in the forward end thereof with vertical rows of alined openings adapted for the interchangeable reception of a pivot pin, a plate mounted upon said pin to swing in a vertical plane and adapted for attachment to said bar, vertically adjustable means carried by said plates for preventing downward movement of said plate below the line of the axis of said beam comprising a plate pivotally connected at its upper end to the upper end of said side plates and abutting said pivot pin with its rear face, a member slidably adjustable upon the last named plate and provided with a forwardly extending portion adapted to engage beneath the bar attached plate when said bar attached plate is axially alined with said plate beam.

2. In combination with a wheel supported beam, a draft bar, side plates secured to said beam and provided in the forward edges with alined rows of openings, a pivot pin adapted for interchangeable mounting in the pairs of openings of said rows and having the ends thereof projecting beyond the sides of said side plates, a plate rigidly attached to said bar and provided with rearwardly extending portions having openings formed therein adapted for the reception of the ends of said pivot pin, a second pivot pin mounted in the uppermost pair of openings, a plate pivotally mounted upon said pin intermediate said side plates and extending downwardly of the forward side of said first named pivot pin, said plate being provided with a longitudinally elongated slot, a bolt slidably mounted in said slot, and members mounted upon the forward end of said bolt and provided with a forwardly extending portion adapted to engage beneath said bar attached plate when said plate is axially alined with said plow beam.

In testimony whereof I hereunto affix my signature.

GEORGE W. WHATLEY